US012592725B2

(12) United States Patent
Arkiszewski et al.

(10) Patent No.: US 12,592,725 B2
(45) Date of Patent: Mar. 31, 2026

(54) CONFIGURABLE FILTER BANDS FOR RADIO FREQUENCY COMMUNICATION

(71) Applicant: Skyworks Solutions, Inc., Irvine, CA (US)

(72) Inventors: Roman Zbigniew Arkiszewski, Oak Ridge, NC (US); Daniel Louis Longstreet, Greensboro, NC (US); Lup Meng Loh, Plano, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 299 days.

(21) Appl. No.: 18/451,673

(22) Filed: Aug. 17, 2023

(65) Prior Publication Data

US 2024/0063831 A1 Feb. 22, 2024

Related U.S. Application Data

(60) Provisional application No. 63/399,362, filed on Aug. 19, 2022.

(51) Int. Cl.
H04B 1/00 (2006.01)
H04B 1/40 (2015.01)

(52) U.S. Cl.
CPC ............. H04B 1/0057 (2013.01); H04B 1/40 (2013.01)

(58) Field of Classification Search
CPC ......... H04B 1/0057; H04B 1/006; H04B 1/40
See application file for complete search history.

(56) References Cited

U.S. PATENT DOCUMENTS

| | | | |
|---|---|---|---|
| 9,143,096 B2 | 9/2015 | Balteanu et al. | |
| 9,397,721 B2* | 7/2016 | Pehlke ................... | H04B 1/525 |
| 9,608,749 B2* | 3/2017 | Mueller .............. | H04B 1/0057 |
| 9,837,972 B2 | 12/2017 | Arkiszewski et al. | |
| 10,263,647 B2 | 4/2019 | Little | |
| 10,284,235 B2 | 5/2019 | Thompson et al. | |
| 10,727,893 B2 | 7/2020 | Zhang et al. | |
| 10,979,088 B2 | 4/2021 | Chang et al. | |
| 11,070,347 B2 | 7/2021 | Chang et al. | |
| 11,152,960 B2 | 10/2021 | Thompson et al. | |
| 11,367,938 B2 | 6/2022 | Jayaraman et al. | |
| 11,601,144 B2 | 3/2023 | Loh et al. | |
| 11,626,842 B2 | 4/2023 | Caron et al. | |
| 11,671,122 B2 | 6/2023 | Loh et al. | |
| 2014/0321339 A1* | 10/2014 | Pehlke ................... | H04B 1/525 |
| | | | 370/281 |
| 2015/0133067 A1* | 5/2015 | Chang ................... | H04B 1/006 |
| | | | 455/78 |
| 2017/0111089 A1* | 4/2017 | Khlat ................... | H04B 7/0617 |
| 2018/0159583 A1* | 6/2018 | Kang ................... | H03H 7/465 |
| 2018/0351454 A1 | 12/2018 | Khesbak et al. | |
| 2019/0181907 A1* | 6/2019 | Pfann ....................... | H03H 9/52 |

(Continued)

*Primary Examiner* — Nguyen T Vo
(74) *Attorney, Agent, or Firm* — Knobbe, Martens, Olson & Bear, LLP

(57) ABSTRACT

Configurable filter bands for radio frequency communication are disclosed. In one aspect, a radio frequency module includes a plurality of n-plexers, each of the n-plexers including n filters, each of the filters configured to pass at least one radio frequency band, and at least two of the radio frequency bands having overlapping frequencies, an antenna terminal, and an antenna switch module configured to connect two or more of the n-plexers to the antenna terminal.

17 Claims, 15 Drawing Sheets

(56) References Cited

U.S. PATENT DOCUMENTS

| 2021/0211145 | A1 | 7/2021 | Loh et al. | |
| 2021/0408984 | A1 | 12/2021 | Arkiszewski et al. | |
| 2022/0247370 | A1 | 8/2022 | Khesbak et al. | |
| 2023/0059854 | A1* | 2/2023 | Kunardi ............... | H04B 1/0057 |
| 2023/0063006 | A1 | 3/2023 | Khesbak et al. | |
| 2023/0080564 | A1 | 3/2023 | Pehlke et al. | |

* cited by examiner

<u>FIG.8</u>

CONFIGURABLE FILTER BANDS FOR RADIO FREQUENCY COMMUNICATION

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

BACKGROUND

Field

Embodiments of this disclosure relate to radio frequency front-end modules that include configurable filters.

Description of the Related Technology

With 5G development, carrier aggregation (CA) is being implemented in radio frequency (RF) modules. To support carrier aggregation, multiple filters are ganged together within a multiplexer. To support 5G, many different filters are included in order to pass frequencies associated with a plurality of radio frequency bands. It can be costly to provide a separate filter for each and every band required to support 5G.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a radio frequency module comprising: a plurality of n-plexers, each of the n-plexers including n filters, each of the filters configured to pass at least one radio frequency band, and at least two of the radio frequency bands having overlapping frequencies; an antenna terminal; and an antenna switch module configured to connect two or more of the n-plexers to the antenna terminal.

In some embodiments, a first one of the n-plexers includes a first filter configured to pass a first one of the at least two radio frequency bands having overlapping frequencies, and a second one of the n-plexers includes a first filter configured to pass a second one of the at least two radio frequency bands having overlapping frequencies.

In some embodiments, the second filter is further configured to pass a third radio frequency band different from the first and second radio frequency bands.

In some embodiments, the antenna switch module is further configured to connect the antenna terminal to the first n-plexer and the second n-plexer to enable communications over the first radio frequency band and the third radio frequency band.

In some embodiments, the antenna switch module is further configured to connect the antenna terminal to the second n-plexer and a third n-plexer to enable communications over the second radio frequency band and a fourth radio frequency band different from the first to third radio frequency bands, the third n-plexer is configured to pass the fourth radio frequency band.

In some embodiments, the second filter is further configured to pass a transmit portion of the third radio frequency band and pass a transmit portion of the third radio frequency band, and the second n-plexer further includes a third filter configured to pass a receive portion of a fifth radio frequency band and a receive portion of the third radio frequency band.

In some embodiments, the third n-plexer includes a fourth filter configured to pass a receive portion of the third radio frequency band, a fifth filter configured to pass a transmit portion of the fifth radio frequency band, and a sixth filter configured to pass transmit and receive portions of the fourth radio frequency band.

In some embodiments, the antenna switch module is further configured to connect the antenna terminal to the first n-plexer, the second n-plexer, and a fourth n-plexer including a seventh filter configured to pass a sixth radio frequency band to enable communications over the first, third, and sixth radio frequency bands.

In some embodiments, a second one of the n-plexers includes a second filter configured to pass a transmit portion of a third radio frequency band and a third one of the n-plexers includes a fourth filter configured to pass a receive portion of the third radio frequency band, the antenna switch module is further configured to connect the antenna terminal to the second n-plexer and the third n-plexer to enable communication over the third radio frequency band.

In some embodiments, connecting of the antenna terminal to two or more of the n-plexers enables E-UTRAN, New Radio, Dual Connectivity (ENDC) multiple-input multiple-output (MIMO) and downlink (DL)CA.

In some embodiments, the at least two of the radio frequency bands having overlapping frequencies is used for ENDC MIMO and DL CA.

In some embodiments, the at least two of the radio frequency bands include band B25Tx and band B3Rx.

Another aspect is a mobile device comprising: an antenna configured to transmit and receive radio frequency signals; and a front-end system coupled to the antenna and including a plurality of n-plexers, each of the n-plexers including n filters, each of the filters configured to pass at least one radio frequency band, and at least two of the radio frequency bands having overlapping frequencies, an antenna terminal coupled to the antenna, and an antenna switch module configured to connect two or more of the n-plexers to the antenna terminal.

In some embodiments, a first one of the n-plexers includes a first filter configured to pass a first one of the at least two radio frequency bands having overlapping frequencies, and a second one of the n-plexers includes a first filter configured to pass a second one of the at least two radio frequency bands having overlapping frequencies.

In some embodiments, the second filter is further configured to pass a third radio frequency band different from the first and second radio frequency bands.

In some embodiments, the antenna switch module is further configured to connect the antenna terminal to the first n-plexer and the second n-plexer to enable communications over the first radio frequency band and the third radio frequency band.

In some embodiments, the antenna switch module is further configured to connect the antenna terminal to the second n-plexer and a third n-plexer to enable communications over the second radio frequency band and a fourth radio frequency band different from the first to third radio frequency bands, the third n-plexer is configured to pass the fourth radio frequency band.

Yet another aspect is a radio frequency module comprising: a front-end including a plurality of n-plexers, each of the n-plexers including n filters, each of the filters configured to pass at least one radio frequency band, and at least two of the radio frequency bands having overlapping frequencies, an antenna terminal, and an antenna switch module configured to connect two or more of the n-plexers to the antenna terminal; and an antenna coupled to the antenna terminal, the front-end and the antenna being enclosed within a common package.

In some embodiments, a first one of the n-plexers includes a first filter configured to pass a first one of the at least two radio frequency bands having overlapping frequencies, and a second one of the n-plexers includes a first filter configured to pass a second one of the at least two radio frequency bands having overlapping frequencies.

In some embodiments, the second filter is further configured to pass a third radio frequency band different from the first and second radio frequency bands.

DETAILED DESCRIPTION

Figure 1A:
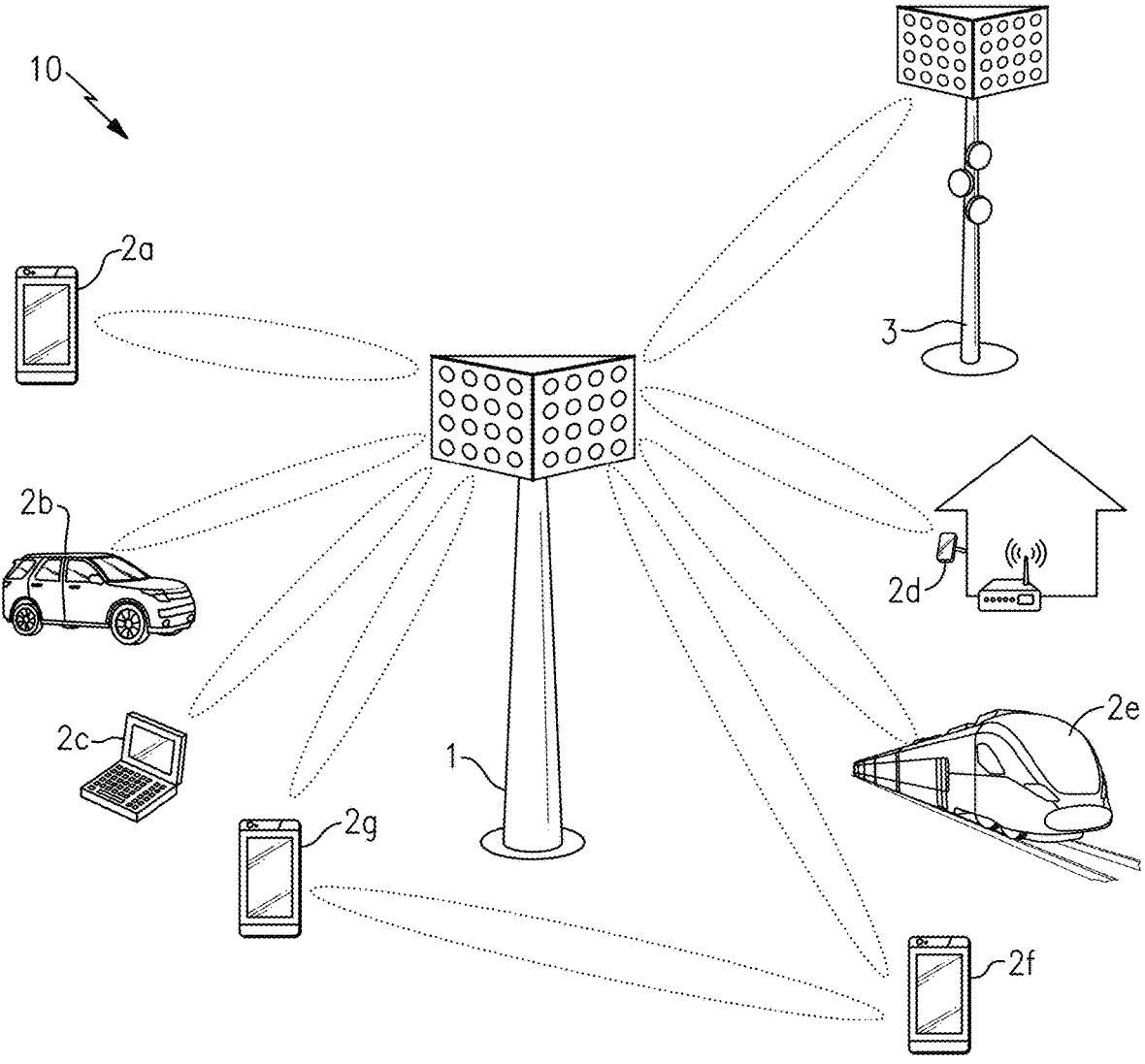
FIG. 1A is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Example Communication Networks and Wireless Communication Devices

FIG. 1A is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1A, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1A supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1A. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1A, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 20.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1A can be used to support a wide variety of advanced communication features, including, but not limited to, eMBB, uRLLC, and/or mMTC.

Figure 1B:
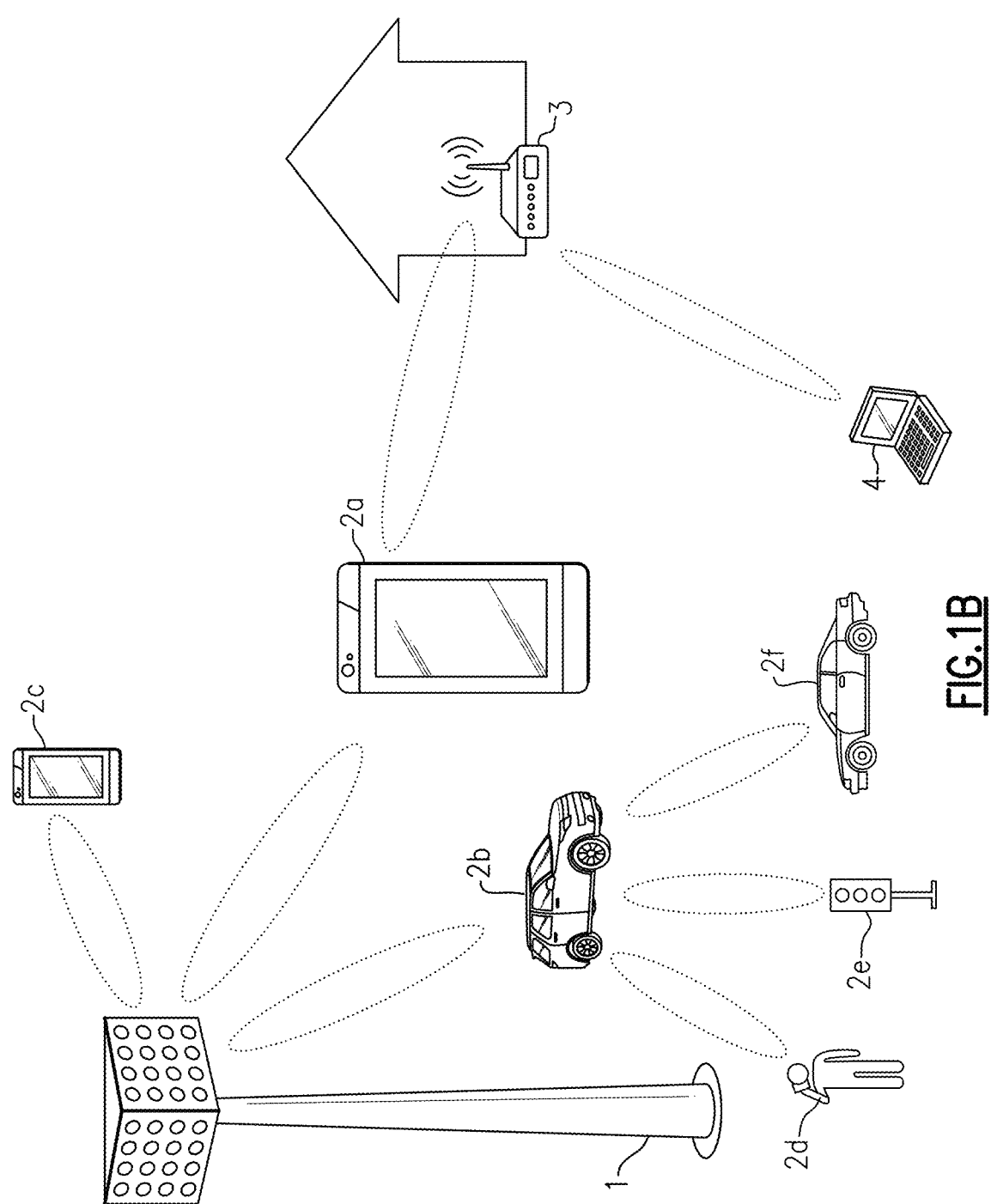
FIG. 1B is a schematic diagram of one example of a mobile device communicating via cellular and WiFi networks.

FIG. 1B is a schematic diagram of one example of a mobile device 2a communicating via cellular and WiFi networks. For example, as shown in FIG. 1B, the mobile device 2a communicates with a base station 1 of a cellular network and with a WiFi access point 3 of a WiFi network. FIG. 1B also depicts examples of other user equipment (UE) communicating with the base station 1, for instance, a wireless-connected car 2b and another mobile device 2c. Furthermore, FIG. 1B also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, UE, such as the mobile device 2a of FIG. 1B, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Furthermore, certain UE can communicate not only with base stations and access points, but also with other UE. For example, the wireless-connected car 2b can communicate with a wireless-connected pedestrian 2d, a wireless-connected stop light 2e, and/or another wireless-connected car 2f using vehicle-to-vehicle (V2V) and/or vehicle-to-everything (V2X) communications.

Although various examples of communication technologies have been described, mobile devices can be implemented to support a wide range of communications.

Various communication links have been depicted in FIG. 1B. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Certain RF communication systems include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device 2a of FIG. 1B is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front-end affects receiver performance of the other transceiver/front-end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels.

Desensitization can arise not only from direct leakage of an aggressor transmit signal to a victim receiver, but also from spectral regrowth components generated in the transmitter. Such interference can lie relatively closely in frequency with the victim receive signal and/or directly overlap it.

Figure 2:
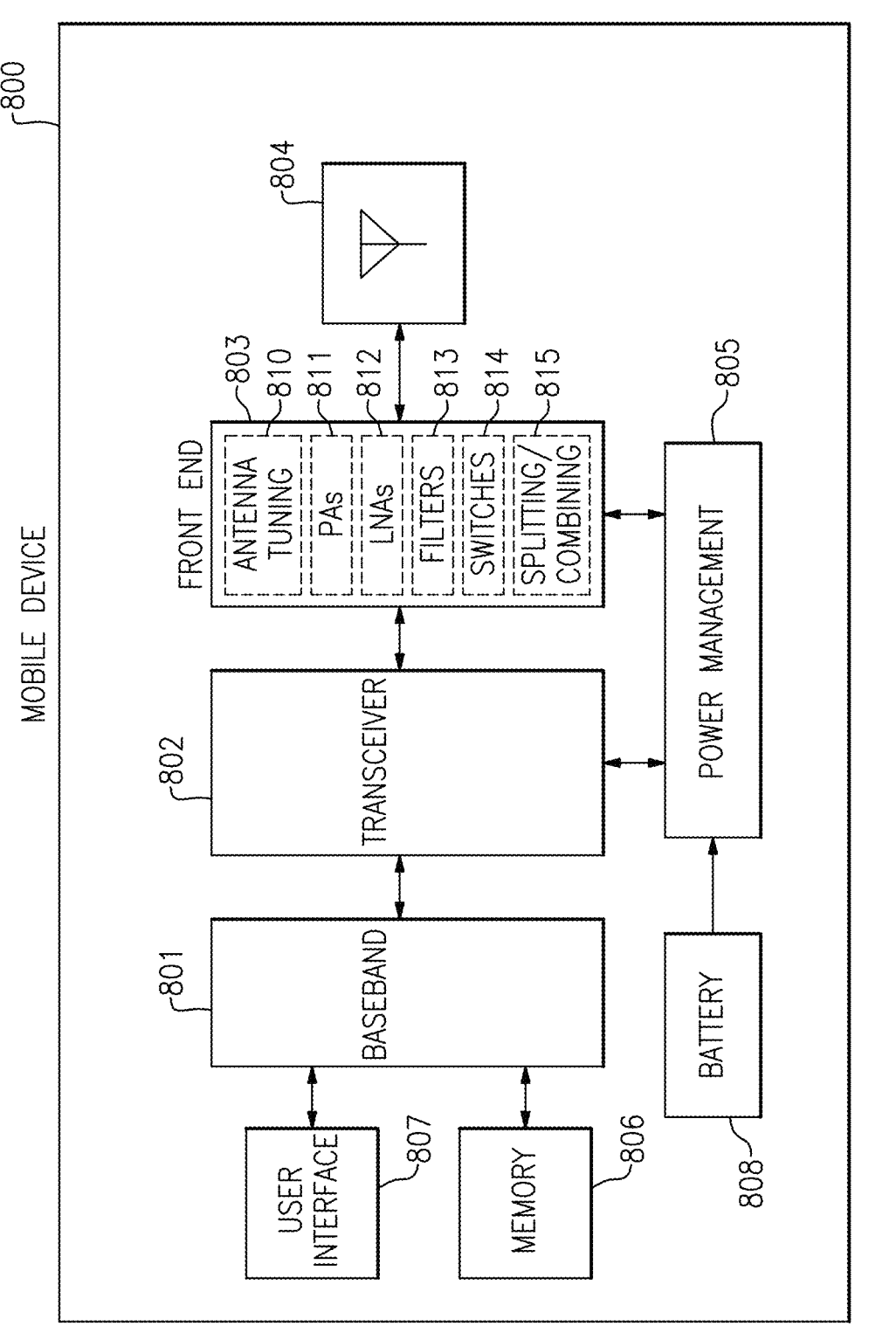
FIG. 2 is a schematic diagram of one embodiment of a mobile device.

FIG. 2 is a schematic diagram of one embodiment of a mobile device 800. The mobile device 800 includes baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 2 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support multiple-input multiple-output (MIMO) communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 2, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 2, the power management system 805 receives a battery voltage from the battery 808. The battery 808 can be any suitable battery for use in the mobile device 800, including, for example, a lithium-ion battery.

Figure 3:
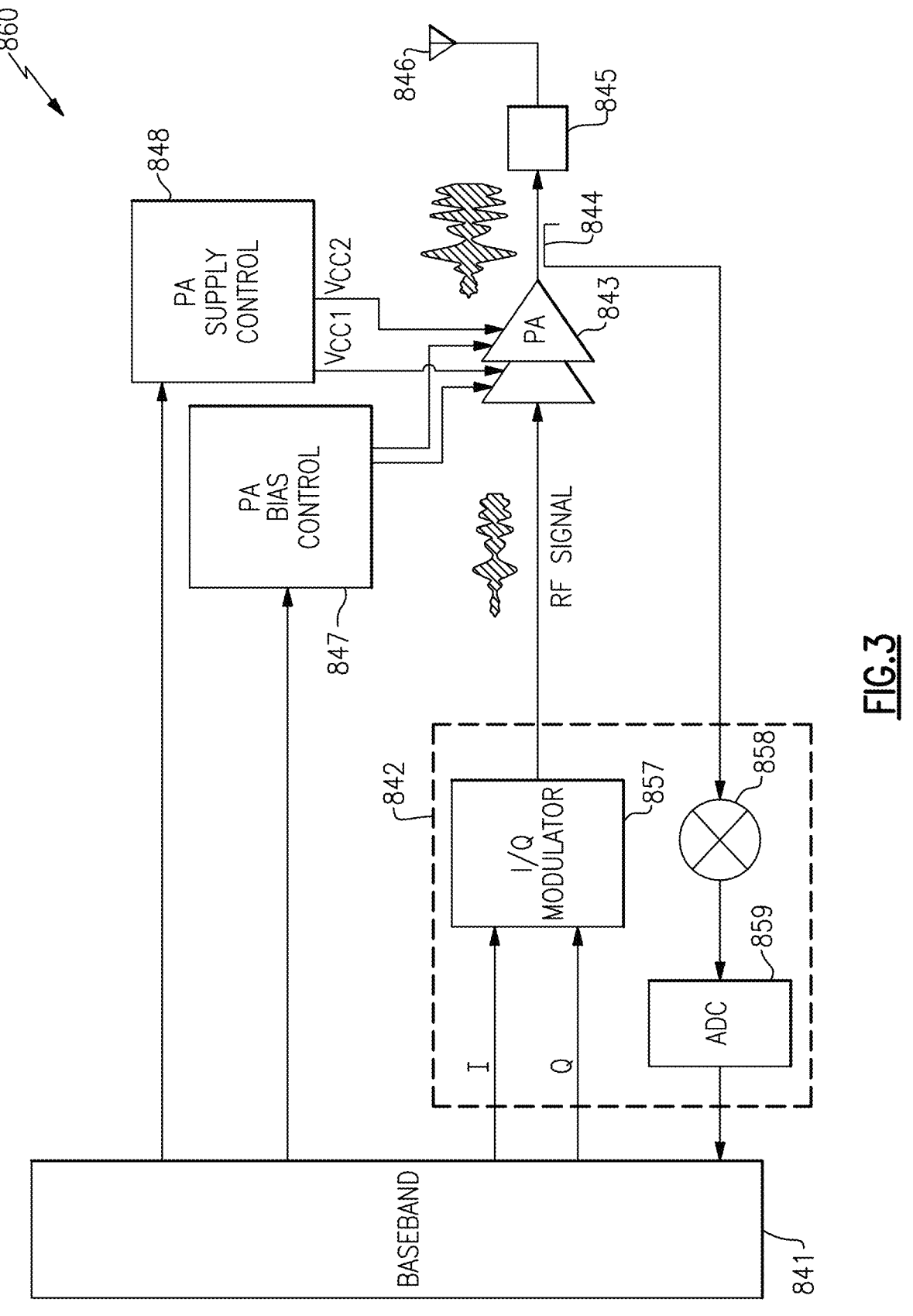
FIG. 3 is a schematic diagram of a power amplifier system according to one embodiment.

FIG. 3 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, diplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 3, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Example Filter Banks for Overlapping Frequency Bands

Depending on the standard used for radio frequency communication, two or more bands used to implement the standard may have at least partially overlapping frequencies. 5G NR introduced several ENDC (E-UTRAN, New Radio, Dual Connectivity) cases.

According to 3GPP standards documents, ENDC allows user equipment to connect to an LTE enodeB that acts as a master node and a 5G gnodeB that acts as a secondary node. In effect, ENDC allows 4G LTE and 5G bandwidth to be used at the same time, and when users attempt to download content, such as a video, the speed at which that video transfers comes from both 4G LTE and 5G simultaneously. In order to implement ENDC, the user equipment front-end can connect a single antenna to two receive paths, corresponding to the frequency bands used for the LTE enodeB and 5G gnodeB wireless nodes.

One example of overlapping frequencies in 5G NR ENDC MIMO and downlink (DL) CA is DC_25_66. A design challenge for implementing radio frequency systems that support 5G NR ENDC MIMO and DL CA involves designing an integrated, low-cost solution that can handle such overlapping frequencies between different bands.

In the DC_25_66 example, there is a problem that arises due to the B25Tx band overlapping with the B3Rx band. In certain implementations of standards prior to 5G NR, a B1/3/40 penta-plexer and a B25 duplexer were used. However, due to the overlapping frequencies between the B25Tx and B3Rx bands, the penta-plexer cannot be switched combined with B25 and reused for 5G NR ENDC and DL CA implementations. In order to reuse the penta-plexer an additional external or internal B25_66 quad-plexer would also have to be added, resulting in additional cost and area penalty for the implementation. In addition to the added cost, it is challenging to fit the additional quad-plexer in an already crowded module.

Aspects of this disclosure relate to a flexible technique for reusing the B3Tx/B1Rx filter (which forms a B66 filter) with the B25 duplexer. As is described in detail below, by splitting the penta-plexer into a duplexer and a tri-plexer, aspects of this disclosure provide additional flexibility to support 5G NR ENDC MIMO and DL CA case DC_25_66, while reusing one or more of the n-plexers for other use cases. The reuse of these n-plexers provides additional flexibility, reduced the footprint of the front-end module, and reduced the cost by reducing the number of filters used to implement the same number of bands. In certain aspects, issues introduced due to the overlapping of certain frequency bands can be addressed by separating filter banks that were previously ganged together.

Figures 4, 5:
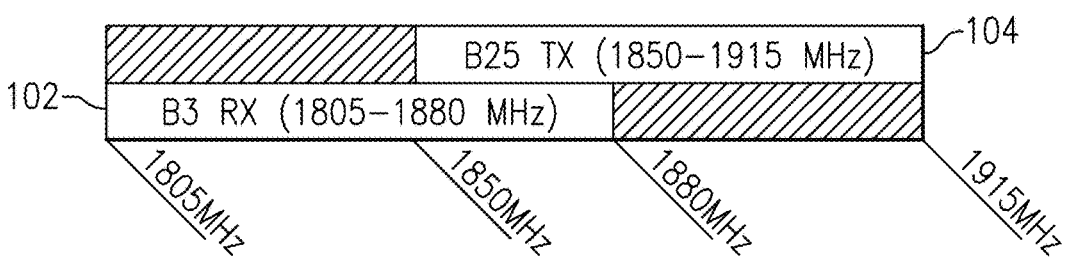
FIG. 4 is an example chart showing overlapping frequencies for two bands.
FIG. 5 is an example block diagram illustrating a portion of a front-end system in accordance with aspects of this disclosure.

FIG. 4 is an example chart showing overlapping frequencies for two bands. With reference to FIG. 4, a first band 102 extends over a first range of frequencies and a second band 104 extends over a second range of frequencies that partially overlaps the first range of frequencies. In the specific illustrated example, the first band 102 is band B3 Rx, which extends from 1805 MHz to 1880 MHz and the second band 104 is band B25 Tx which extends from 1850 MHz to 1915 Mhz. However, this is merely one example and aspects of this disclosure can be applied to other bands that at least partially overlap.

Figure 6:
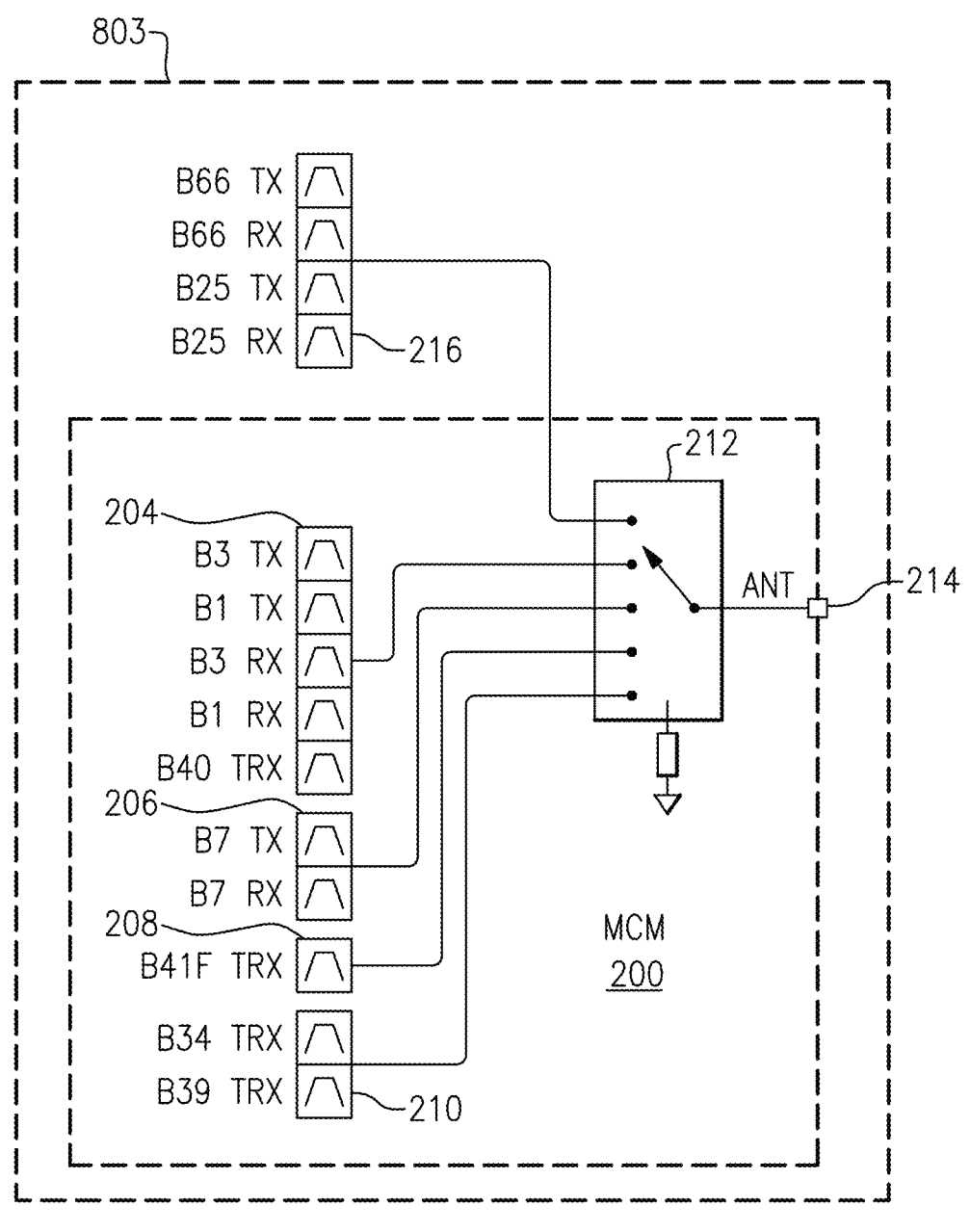
FIG. 6 is an example block diagram illustrating a portion of a front-end system configured to implement 5G NR ENDC multiple-input multiple-output (MIMO) and downlink (DL) CA in accordance with aspects of this disclosure.
Figure 7:
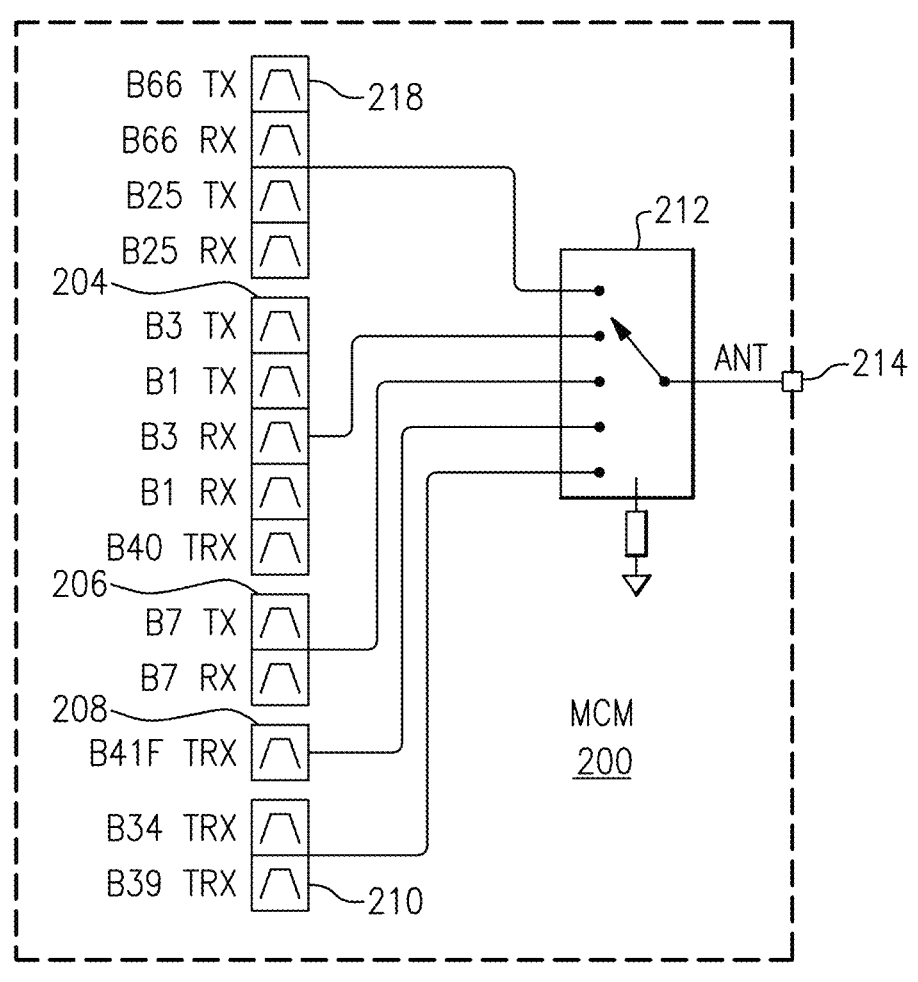
FIG. 7 is an example block diagram illustrating a multi-chip module configured to implement 5G NR ENDC MIMO and DL CA in accordance with aspects of this disclosure.

It is challenging to design an integrated low-cost solution dealing with overlapping frequencies, such as those illustrated in FIG. 4. 5G NR introduced several ENDC cases, one of which is DC_25_66. The DC_25_66 ENDC case posed a problem with band B25Tx overlapping with band B3Rx. In particular, the B1/3/40 penta-plexer cannot be reused for DC_25_66 due to the overlap of band B25Tx with band B3Rx. In order to implement DC_25_66 while reusing the B1/3/40 penta-plexer, an external or internal B25_66 quad-plexer can be added as shown in FIGS. 6 and 7. In addition to the additional cost for the added component(s), it is challenging to fit another duplexer in an already crowded front-end module.

FIG. 5 is an example block diagram illustrating a portion of a front-end system in accordance with aspects of this disclosure. In some implementations, the example front-end system 803 may implement the 4G standard. In particular, the front-end system 803 of FIG. 5 includes a subset of filters 813 and switches 814 that may be used to implement a full front-end system 803 (e.g., as shown in FIG. 2). With reference to FIG. 5, the front-end system 803 includes a multichip module (MCM) including a plurality of n-plexers 202, 204, 206, 208, and 210, a switch (also referred to as an antenna switch module (ASM)) 212, and an antenna terminal 214.

The n-plexers 202-212 include a first duplexer 202, a first penta-plexer 204, a second duplexer 206, a first filter 208, and a third duplexer 210. The first duplexer 202 can include a filter for the B25 Tx band and a filter for the B25 Rx band. The first penta-plexer 204 can include a filter for the B3 Tx band, a filter for the B1 Tx band, a filter for the B3 Rx band, a filter for the B1 Rx band, and a filter for the B40 TRx band. The second duplexer 206 can include a filter for the B7 Tx band and a filter for the B7 Rx band. The first filter 208 can be a filter for the B41F TRx band. The third duplexer 210 can include a filter for the B34TRx band and a filter for the B39TRx band. The above filters and bands are merely examples and other implementations can include n-plexers 202-210 including filters for other sets of bands without departing from aspects of this disclosure.

The duplexer 202 together with the penta-plexer 204 may be optimized for carrier aggregation performance for 4G LTE. This implementation can support band B66 by using the filters for band B3Tx and B1Rx (e.g., by extended the frequency range over 2110-2200 MHz). For example, band B66Tx can range from 1710-1780 MHz while band B66Rx can range from 2110-2200 MHz. However, this implementation may not support bands B25 and n66 internally (e.g., within the MCM 200) due to the frequency loading between bands B25Tx and B3Rx.

FIG. 6 is an example block diagram illustrating a portion of a front-end system configured to implement 5G NR ENDC MIMO and DL CA in accordance with aspects of this disclosure. The implementation of FIG. 6 builds on the FIG. 5 front-end system 803 by adding a separate quad-plexer 216 external to the MCM 200. The n-plexers 204-210, the switch 212, and the antenna terminal 214 may be substantially similar to those discussed above in connection with FIG. 5. The quad-plexer 216 includes a thirteenth filter for band B66 Tx, a fourteenth filter for band B66 Rx, a fifteenth filter for band B25 Tx, and a sixteenth filter for band B25 Rx. The addition of the quad-plexer 216 provides 5G NR ENDC MIMO and DL CA support for bands B25+n66.

FIG. 7 is an example block diagram illustrating a multichip module 200 configured to implement 5G NR ENDC MIMO and DL CA in accordance with aspects of this disclosure. The implementation of FIG. 7 is similar to the FIG. 6 front-end system 803 except that the external quad-plexer 216 has been replaced with an internal quad-plexer 218 located inside the MCM 200. The n-plexers 204-210, the switch 212, and the antenna terminal 214 may be substantially similar to those discussed above in connection with FIGS. 5 and 6. The internal quad-plexer 218 is substantially the same as the external quad-plexer 216 in FIG. 7. The addition of the quad-plexer 216 provides 5G NR ENDC MIMO and DL CA support for bands B25+n66. The embodiment of FIG. 7 has an advantage over the FIG. 6 embodiment in that users of the MCM 200 do not need to implement an external quad-plexer 216.

However, there are at least some drawbacks to the implementations discussed in connection with FIGS. 6 and 7. For example, the use of an external quad-plexer 216 introduces certain drawbacks, including additional costs, additional size, and additional manufacturing steps. In addition, the use of an internal quad-plexer 218 introduces certain drawbacks, including increased manufacturing costs and the size of the filter footprint within the MCM 200. Thus, it is desirable to provide an implementation that can support 5G NR ENDC MIMO and DL CA bands B25+n66 (or other overlapping bands) without introducing one or more of the above drawbacks.

Aspects of this disclosure relate to systems and techniques for implementing 5G NR ENDC MIMO and DL CA that address at least some of the above-identified drawbacks. In some implementations, the MCM 200 can address at least some of the drawbacks while reducing the number of required filters by two.

Figure 8:
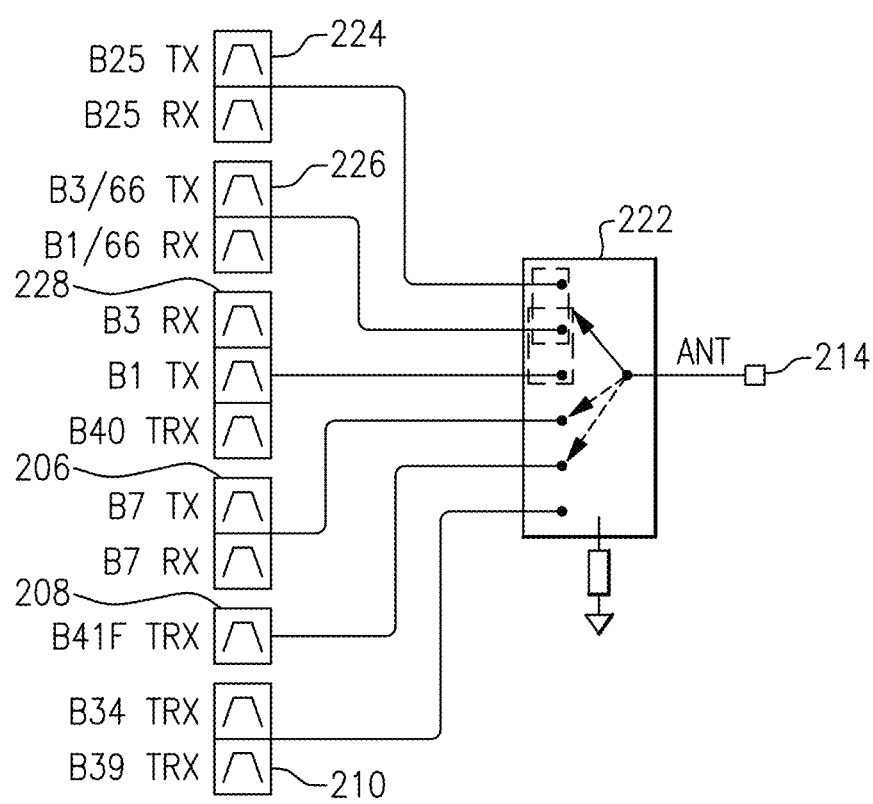
FIG. 8 is an example block diagram illustrating a multi-chip module having a configurable filter bank in accordance with aspects of this disclosure.

FIG. 8 is an example block diagram illustrating a multichip module 200 having a configurable filter bank in accordance with aspects of this disclosure. In some implementations, the configurable filter bank may be used to support 5G NR ENDC MIMO and DL CA. The implementation of FIG. 8 is similar to the FIG. 7 MCM 200. For example, the n-plexers 206-210 and the antenna terminal 214 of FIG. 8 may be substantially similar to those discussed above in connection with FIGS. 5-7. However, the internal quad-plexer 218 and the penta-plexer 204 may be replaced with a fourth duplexer 224, a fifth duplexer 226, and a tri-plexer 228. The switch 222 may be configured to connect two or more of the n-plexers 206-210, 224, and 226 to the antenna terminal 214. For example, the switch 222 can simultaneously connect two or more of the n-plexers 206-210, 224, and 226 to the antenna terminal 214 to implement a larger n-plexer comprising the filters in the two or more of the n-plexers 206-210, 224, and 226. Aspects of this disclosure reduce the number of required filters by two, for example, from 14 filters to 12 filters. This reduction in the number of required filters necessary to implement ENDC and DL CA provides substantial savings in cost and area.

In some implementations, the fourth duplexer 224 includes a filter for the B25 Tx band and a filter for the B25 Rx band, the fifth duplexer 226 includes a filter for the B3/66 Tx bands and a filter for the B3/B66 Rx bands, and the tri-plexer 228 includes filter for the B3 Rx band, a filter for the B1 Tx band, and a filter for the B40 TRx band. The switch 222 can be configured to connect different combinations of the n-plexers 206-210, 224, and 226 to the antenna terminal 214 in order to implement the same combinations of filters provided by the embodiments of FIGS. 7 and 8. Table 1 provides an example set of states for the switch 222 in accordance with aspects of this disclosure.

TABLE 1

| IN1 | IN2 | IN3 |
|------|-------------|----------|
| B25 | B41 | — |
| B25 | B7 | — |
| B66 | B1Tx/T3Rx/B40 | — |
| B66 | B1Tx/T3Rx/B40 | B7 |
| B66 | B1Tx/T3Rx/B40 | B41F TRx |
| B66 | B1Tx/T3Rx/B40 | TRx1 B32 |
| B66 | B25 | — |
| B41 | B39 | — |
| B41 | — | — |
| B7 | — | — |
| B2 (25) | — | — |
| 2G_MB | — | — |

By splitting the penta-plexer 204 into the fifth duplexer 226 and the tri-plexer 228, the switch 222 is able to combine the filter banks of the n-plexers 206-210, 224, and 226 to form the combination of filter present in the penta-plexer 204 or to combine the fifth duplexer 226 with the fourth duplexer 224. Because the fifth duplexer 226 is also configured to band-pass the same frequencies for the B66 Tx and Rx bands, the MCM 200 according to the embodiment of FIG. 8 eliminates the need for an additional n66 duplexer required for ENDC MIMO and DL CA B25_n66. In other words, the switch 222 is able to connect both the fourth duplexer 224 and the fifth duplexer 226 to the antenna terminal 214 to provide the same functionality as the penta-plexer 204, thereby providing an implementation for ENDC MIMO and DL CA B25_n66.

Aspects of this disclosure provide a flexible way to reuse the band B3Tx/B1Rx filters (which also form a B66 filter) in the fifth duplexer 226 with the band B25 filters in the fourth duplexer 224. Aspects of this disclosure further provide the flexibility of forming a penta-plexer (e.g., B1TRX/3TRX/40TDD) or a quad-plexer (B25TRX/66TRX) by the selective combination of the fourth duplexer 224, the fifth duplexer 226, and/or the tri-plexer 228. For example, the switch 222 can simultaneously connect two or more of the fourth duplexer 224, the fifth duplexer 226, and/or the tri-plexer 228 to the antenna terminal 214 to implement the penta-plexer (e.g., B1TRX/3TRX/40TDD) or the quad-plexer (B25TRX/66TRX). One advantage to these implementations is that the front-end 200 does not require any additional filters (e.g., internal quad-plexer 218 of FIG. 7) to be placed inside the module.

Figure 9:
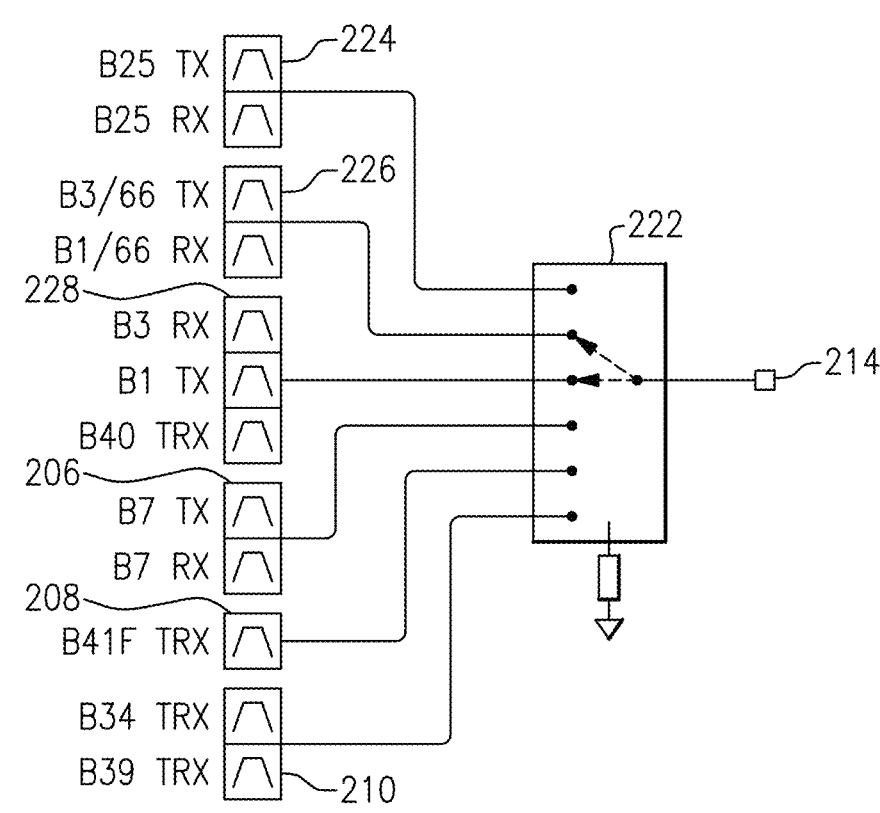
FIG. 9 illustrates a first example state of the switch of FIG. 8.

FIG. 9 illustrates a first example state of the switch 222 of FIG. 8. With reference to FIG. 9, the switch 222 is simultaneously connecting the fifth duplexer 226 and the tri-plexer 228 to the antenna port 214. This configuration of the switch 222 implements substantially the same combination of filters as the penta-plexer 204 of FIGS. 6 and 7.

Figure 10:
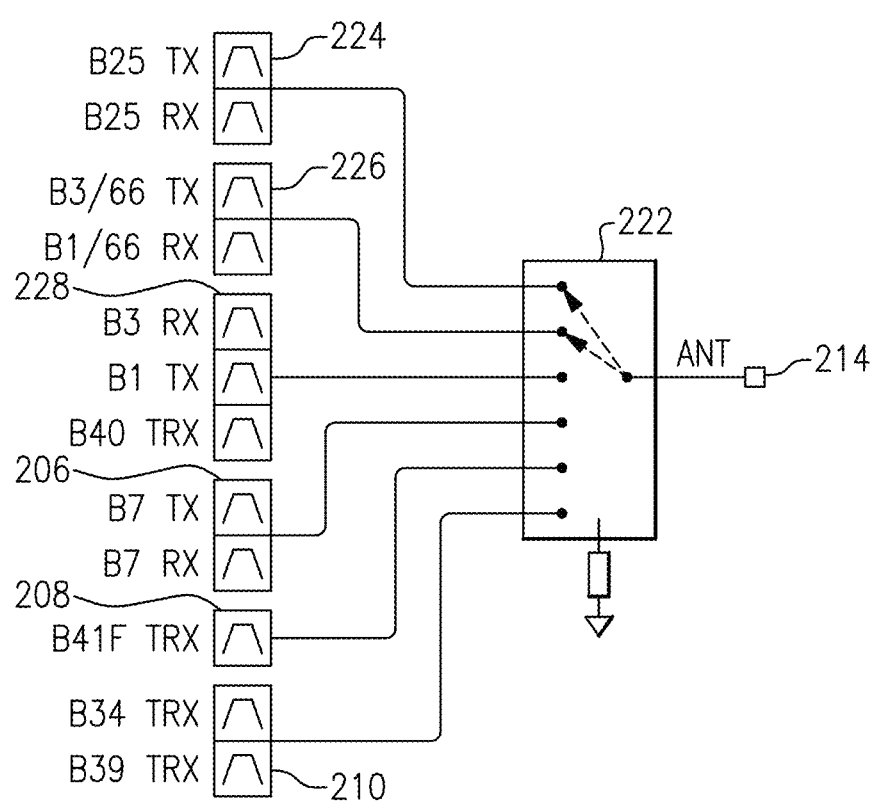
FIG. 10 illustrates a second example state of the switch of FIG. 8.

FIG. 10 illustrates a second example state of the switch 222 of FIG. 8. With reference to FIG. 10, the switch 222 is simultaneously connecting the fourth duplexer 224 and the fifth duplexer 226. This configuration of the switch 222 implements substantially the same combination of filters as the external and internal quad-plexers 216 and 218 of FIGS. 6 and 7.

Figure 11:
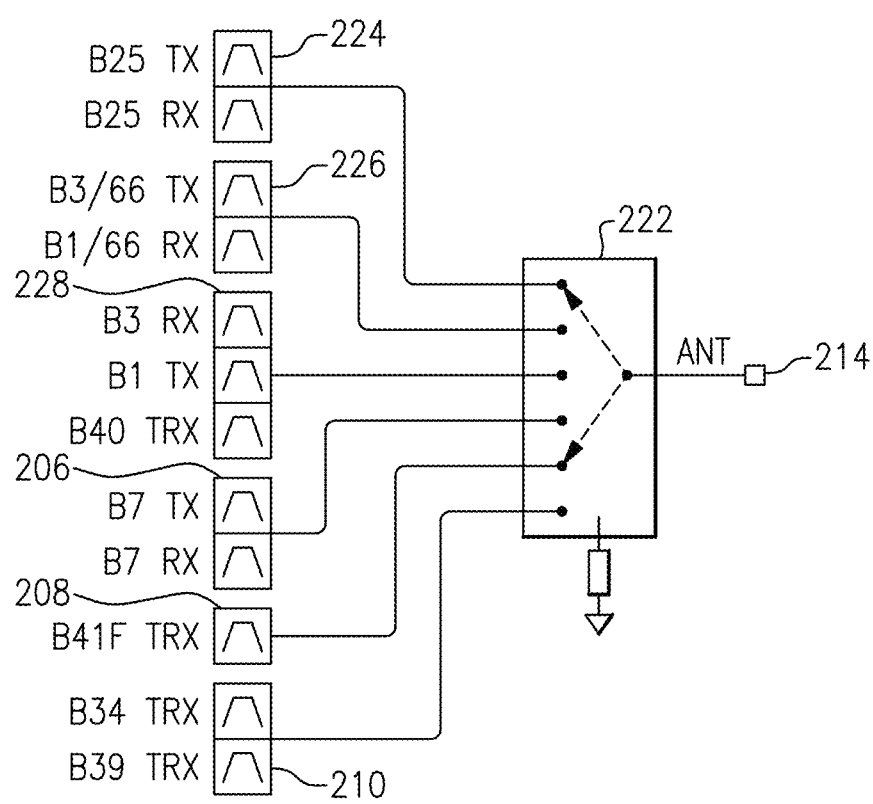
FIG. 11 illustrates a third example state of the switch of FIG. 8.

FIG. 11 illustrates a third example state of the switch 222 of FIG. 8. With reference to FIG. 11, the switch 222 is simultaneously connecting the fourth duplexer 224 and the first filter 208. This configuration of the switch 222 connects the band B25 Tx and Rx filters with the band B41F TRx filter to support bands B25+n41.

Figure 12:
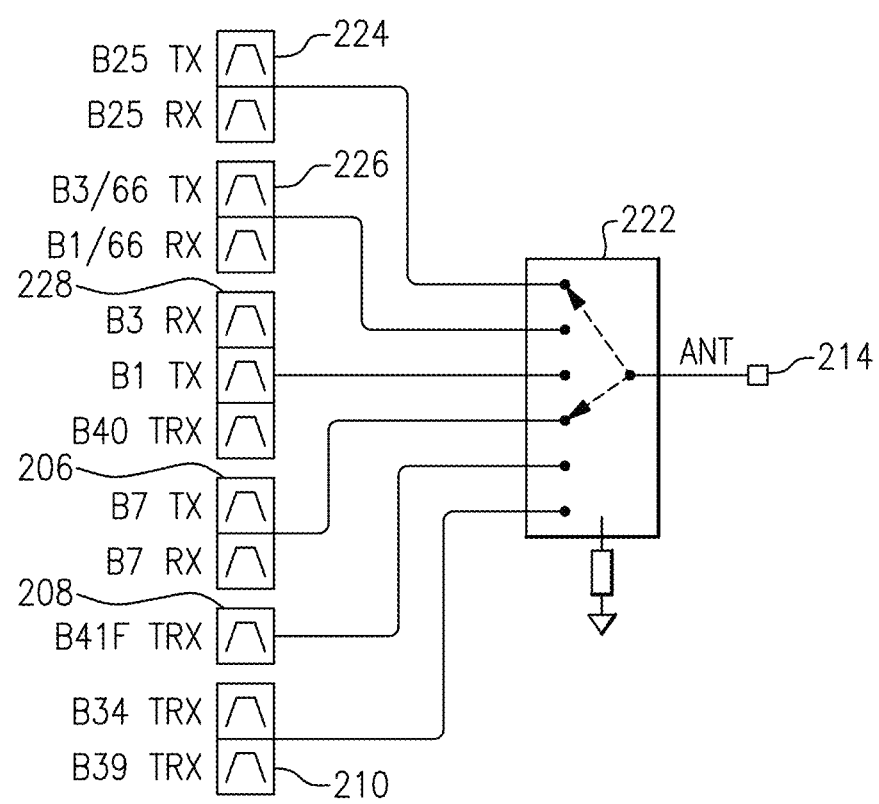
FIG. 12 illustrates a fourth example state of the switch of FIG. 8.

FIG. 12 illustrates a fourth example state of the switch 222 of FIG. 8. With reference to FIG. 12, the switch 222 is simultaneously connecting the fourth duplexer 224 and the second duplexer 206. This configuration of the switch 222 connects the band B25 Tx and Rx filters with the band B7 Tx and Rx filters to support bands B25+n7.

Figure 13:
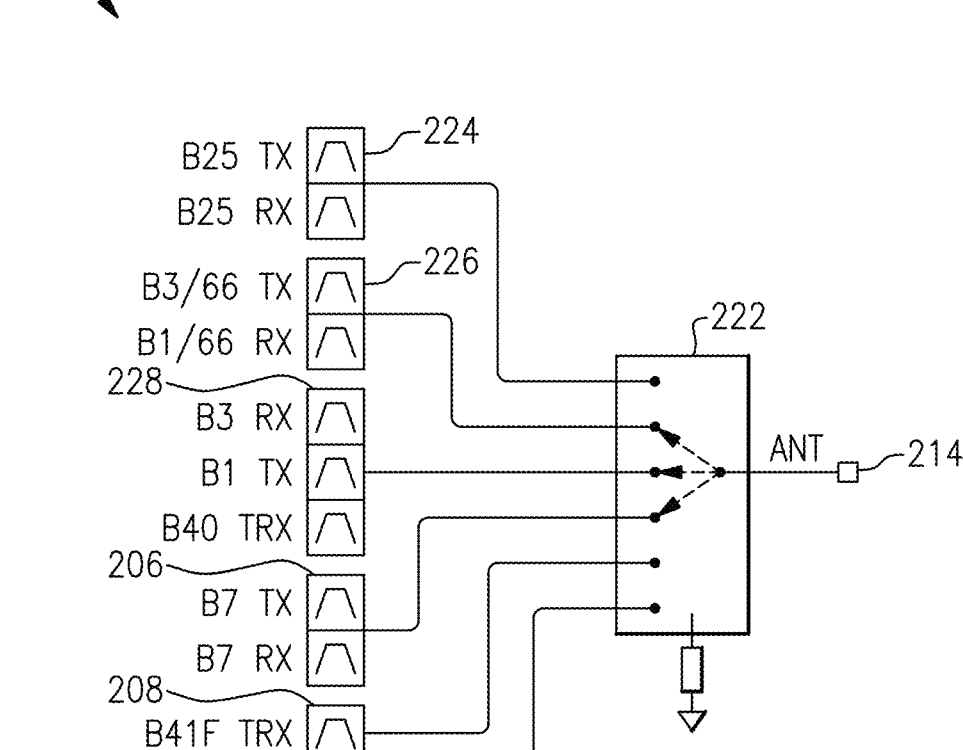
FIG. 13 illustrates a fifth example state of the switch of FIG. 8.

FIG. 13 illustrates a fifth example state of the switch 222 of FIG. 8. With reference to FIG. 13, the switch 222 is simultaneously connecting the fifth duplexer 226, the tri-plexer 228, and the second duplexer 206. This configuration of the switch 222 connects the bands B3/B66 Tx and Rx filters, the band B3 Rx filter, the band B1 Tx filter, the band B40 TRx filter, and the band B7 Tx and Rx filters to support the penta-plexer (e.g., penta-plexer 204)+n7.

Figure 14:
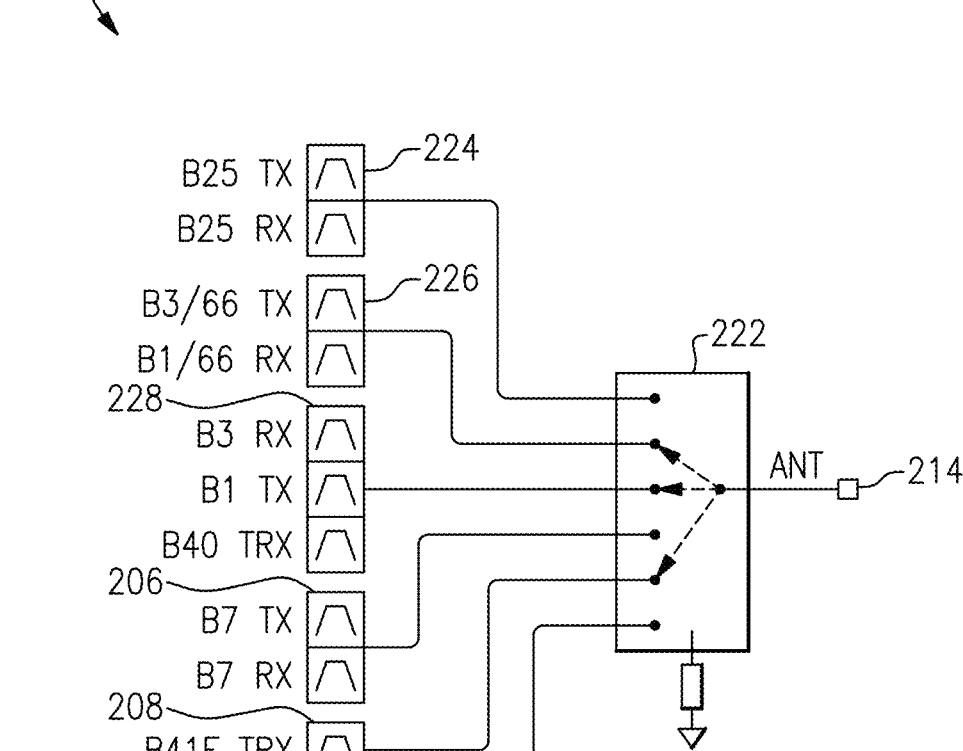
FIG. 14 illustrates a sixth example state of the switch of FIG. 8.

FIG. 14 illustrates a sixth example state of the switch 222 of FIG. 8. With reference to FIG. 14, the switch 222 is simultaneously connecting the fifth duplexer 226, the tri-plexer 228, and the first filter 208. This configuration of the switch 222 simultaneously connects the bands B3/B66 Tx and Rx filters, the band B3 Rx filter, the band B1 Tx filter, the band B40 TRx filter, and the band B41F TRx filter to support the penta-plexer (e.g., penta-plexer 204)+n41.

Figure 15:
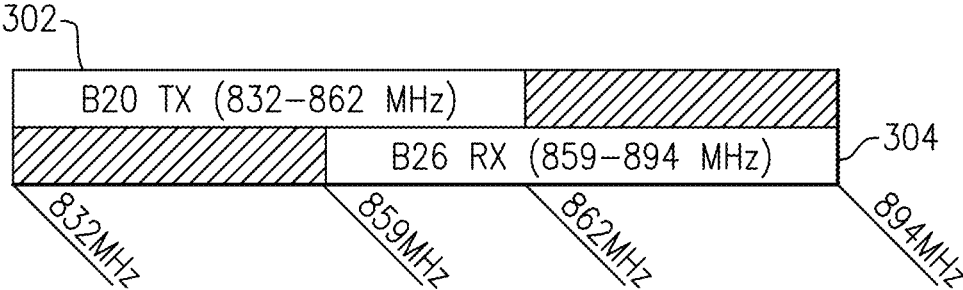
FIG. 15 illustrates another example of overlap between different bands in accordance with aspects of this disclosure.

FIG. 15 illustrates another example overlap between different bands in accordance with aspects of this disclosure. With reference to FIG. 15, a first band 302 extends over a first range of frequencies and a second band 304 extends of a second range of frequencies that partially overlaps the first range of frequencies. In the specific illustrated example, the first band 302 is band B20 Tx, which extends from 832 MHz to 862 MHz and the second band 304 is band B26 Rx which extends from 850 MHz to 894 Mhz.

Figure 16:
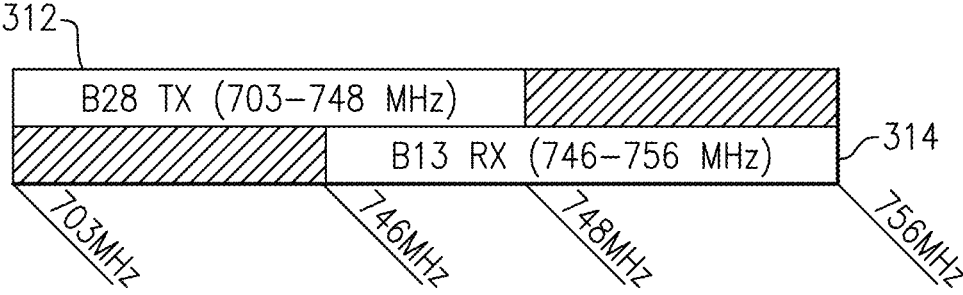
FIG. 16 illustrates yet another example of overlap between different bands in accordance with aspects of this disclosure.

FIG. 16 illustrates yet another example overlap between different bands in accordance with aspects of this disclosure. With reference to FIG. 16, a first band 312 extends over a first range of frequencies and a second band 314 extends of a second range of frequencies that partially overlaps the first range of frequencies. In the specific illustrated example, the first band 312 is band B28 Tx, which extends from 703 MHz to 748 MHz and the second band 314 is band B13 Rx which extends from 746 MHz to 756 Mhz.

While FIGS. 4, 15, and 16 illustrate certain example overlapping bands, there may be other overlapping bands depending on the particular radio frequency standard being implemented. For example, other example include band B20TX overlapping with B26RX, and B28TX overlapping with B13RX.

CONCLUSION

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency module comprising:
a plurality of n-plexers, each of the n-plexers including a plurality of filters, each of the filters configured to pass at least one radio frequency band, and at least two of the radio frequency bands having overlapping frequencies;
an antenna terminal; and
an antenna switch module configured to connect two or more of the n-plexers to the antenna terminal, a first one of the n-plexers including a first filter configured to pass both a first one of the at least two radio frequency bands having overlapping frequencies and a third radio frequency band different from the at least two radio frequency bands, and a second one of the n-plexers including a first filter configured to pass a second one of the at least two radio frequency bands having overlapping frequencies.

2. The radio frequency module of claim 1 wherein the second filter is further configured to pass the third radio frequency band.

3. The radio frequency module of claim 2 wherein the antenna switch module is further configured to connect the antenna terminal to the first n-plexer and the second n-plexer to enable communications over the first radio frequency band and the third radio frequency band.

4. The radio frequency module of claim 2 wherein the antenna switch module is further configured to connect the antenna terminal to the second n-plexer and a third n-plexer to enable communications over the second radio frequency band and a fourth radio frequency band different from the first to third radio frequency bands, the third n-plexer is configured to pass the fourth radio frequency band.

5. The radio frequency module of claim 4 wherein the second filter is further configured to pass a transmit portion of the third radio frequency band and pass a transmit portion of the third radio frequency band, and the second n-plexer further includes a third filter configured to pass a receive portion of a fifth radio frequency band and a receive portion of the third radio frequency band.

6. The radio frequency module of claim 4 wherein the third n-plexer includes a fourth filter configured to pass a receive portion of the third radio frequency band, a fifth filter configured to pass a transmit portion of the fifth radio frequency band, and a sixth filter configured to pass transmit and receive portions of the fourth radio frequency band.

7. The radio frequency module of claim 2 wherein the antenna switch module is further configured to connect the antenna terminal to the first n-plexer, the second n-plexer, and a fourth n-plexer including a seventh filter configured to pass a sixth radio frequency band to enable communications over the first, third, and sixth radio frequency bands.

8. The radio frequency module of claim 1 wherein the second one of the n-plexers includes a second filter configured to pass a transmit portion of a third radio frequency band and a third one of the n-plexers includes a fourth filter configured to pass a receive portion of the third radio frequency band, the antenna switch module is further configured to connect the antenna terminal to the second n-plexer and the third n-plexer to enable communication over the third radio frequency band.

9. The radio frequency module of claim 1 wherein connecting of the antenna terminal to two or more of the n-plexers enables E-UTRAN, New Radio, Dual Connectivity (ENDC) multiple-input multiple-output (MIMO) and downlink (DL) CA.

10. The radio frequency module of claim 9 wherein the at least two of the radio frequency bands having overlapping frequencies is used for ENDC MIMO and DL CA.

11. The radio frequency module of claim 1 wherein the at least two of the radio frequency bands include band B25Tx and band B3Rx.

12. A mobile device comprising:
an antenna configured to transmit and receive radio frequency signals; and
a front-end system coupled to the antenna and including a plurality of n-plexers, each of the n-plexers including n filters, each of the filters configured to pass at least one radio frequency band, and at least two of the radio frequency bands having overlapping frequencies, an antenna terminal coupled to the antenna, and an antenna switch module configured to connect two or more of the n-plexers to the antenna terminal, a first one of the n-plexers including a first filter configured to pass both a first one of the at least two radio frequency bands having overlapping frequencies and a third radio frequency band different from the at least two radio frequency bands, and a second one of the n-plexers including a first filter configured to pass a second one of the at least two radio frequency bands having overlapping frequencies.

13. The mobile device of claim 3 wherein the second filter is further configured to pass the third radio frequency band different from the first and second radio frequency bands.

14. The mobile device of claim 13 wherein the antenna switch module is further configured to connect the antenna terminal to the first n-plexer and the second n-plexer to enable communications over the first radio frequency band and the third radio frequency band.

15. The mobile device of claim 13 wherein the antenna switch module is further configured to connect the antenna terminal to the second n-plexer and a third n-plexer to enable communications over the second radio frequency band and a fourth radio frequency band different from the first to third radio frequency bands, the third n-plexer is configured to pass the fourth radio frequency band.

16. A radio frequency module comprising:

a front-end including a plurality of n-plexers, each of the n-plexers including n filters, each of the filters configured to pass at least one radio frequency band, and at least two of the radio frequency bands having overlapping frequencies, an antenna terminal, and an antenna switch module configured to connect two or more of the n-plexers to the antenna terminal; and an antenna coupled to the antenna terminal, the front-end and the antenna being enclosed within a common package, a first one of the n-plexers including a first filter configured to pass both a first one of the at least two radio frequency bands having overlapping frequencies and a third radio frequency band different from the at least two radio frequency bands, and a second one of the n-plexers including a first filter configured to pass a second one of the at least two radio frequency bands having overlapping frequencies.

17. The radio frequency module of claim 16 wherein the second filter is further configured to pass the third radio frequency band different from the first and second radio frequency bands.

\* \* \* \* \*